(12) United States Patent
Baldreich et al.

(10) Patent No.: US 9,498,062 B2
(45) Date of Patent: Nov. 22, 2016

(54) ACTUATING DRIVE FOR MOVING A MOVEABLE FURNITURE PART

(71) Applicant: Julius Blum GmbH, Hoechst (AT)

(72) Inventors: Armin Baldreich, Lauterach (AT); Kurt Haemmerle, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 14/797,594

(22) Filed: Jul. 13, 2015

(65) Prior Publication Data
US 2015/0351539 A1 Dec. 10, 2015

Related U.S. Application Data

(63) Continuation of application No. PCT/AT2013/000214, filed on Dec. 23, 2013.

(30) Foreign Application Priority Data

Feb. 8, 2013 (AT) ...................................... 103/2013

(51) Int. Cl.
*A47B 95/02* (2006.01)
*A47B 96/00* (2006.01)
(Continued)

(52) U.S. Cl.
CPC ............... *A47B 96/00* (2013.01); *A47B 97/00* (2013.01); *E05D 11/1064* (2013.01); *E05F 1/1058* (2013.01); *E06B 3/34* (2013.01); *E06B 5/006* (2013.01); *F03G 1/10* (2013.01); *A47B 2220/0061* (2013.01); *E05F 1/1041* (2013.01);
(Continued)

(58) Field of Classification Search
CPC ............. E05D 11/1064; E05F 1/1261; Y10T 16/5383; Y10T 16/53848; Y10T 16/5386
See application file for complete search history.

(56) References Cited

U.S. PATENT DOCUMENTS 2,035,823 A 3/1936 Moore
2,725,052 A * 11/1955 Barnett ................. F24C 15/023
126/191

(Continued)

FOREIGN PATENT DOCUMENTS

CN 1985064 6/2007
DE 199 18 823 7/2000

(Continued)

OTHER PUBLICATIONS

International Search Report (ISR) issued Mar. 7, 2014 in International (PCT) Application No. PCT/AT2013/000214.

(Continued)

*Primary Examiner* — Matthew Ing
*Assistant Examiner* — Andres Gallego
(74) *Attorney, Agent, or Firm* — Wenderoth, Lind & Ponack, L.L.P.

(57) ABSTRACT

An actuating drive for moving a moveable furniture part includes at least one moveably mounted actuating member for moving the moveable furniture part a spring device for subjecting the actuating member to force; and an adjustment device by which a force of the spring device acting on the actuating member can be adjusted. The adjustment device has an adjustment screw having a thread, wherein the force of the spring device acting on the actuating member can be adjusted via a screw nut mounted displaceably along the thread. At least one spring element is provided via which the screw nut can be subjected, at at least one end region of the adjustment screw, to a force directed away from the end region.

15 Claims, 5 Drawing Sheets

(51) Int. Cl.

| | | |
|---|---|---|
| *A47B 97/00* | (2006.01) | |
| *E06B 5/00* | (2006.01) | |
| *E06B 3/34* | (2006.01) | |
| *F03G 1/10* | (2006.01) | |
| *E05D 11/10* | (2006.01) | |
| *E05F 1/12* | (2006.01) | |
| *E05F 1/10* | (2006.01) | |

(52) U.S. Cl.
CPC ........ *E05F 1/1261* (2013.01); *E05Y 2201/638* (2013.01); *E05Y 2600/10* (2013.01); *E05Y 2600/20* (2013.01); *E05Y 2900/20* (2013.01); *Y10T 16/5386* (2015.01)

(56) References Cited

U.S. PATENT DOCUMENTS

| | | | |
|---|---|---|---|
| 3,256,554 A | 6/1966 | Turner | |
| 3,579,709 A * | 5/1971 | Pierie | ........................ E05F 3/16 16/333 |
| 3,737,947 A * | 6/1973 | Little | .................... E05F 1/1261 16/290 |
| 4,000,540 A * | 1/1977 | Newlon | ................. E05F 1/1253 16/298 |
| 4,295,245 A * | 10/1981 | Malcom | .............. E05D 11/1014 16/291 |
| 6,463,627 B1 | 10/2002 | Hirtsiefer | |
| 7,500,287 B2 | 3/2009 | Brüstle | |
| 2002/0085868 A1 | 7/2002 | Fujimoto | |
| 2004/0239213 A1 * | 12/2004 | Hirtsiefer | .............. E05D 15/262 312/109 |
| 2008/0099637 A1 * | 5/2008 | Pai | ........................ F16M 11/04 248/157 |
| 2008/0127452 A1 * | 6/2008 | Jackson | .................... E05D 3/08 16/50 |
| 2010/0205772 A1 * | 8/2010 | Haab | .................. E05D 15/0656 16/91 |
| 2013/0333291 A1 | 12/2013 | Blum | |
| 2016/0160551 A1 * | 6/2016 | Lutz | .................... E05D 11/1064 74/469 |

FOREIGN PATENT DOCUMENTS

| | | | |
|---|---|---|---|
| DE | 100 19 337 | 10/2001 | |
| EP | 0 952 290 | 10/1999 | |
| EP | 1 148 200 | 10/2001 | |
| IT | EP 0707815 A2 * | 4/1996 | ........... A47B 95/008 |
| JP | 2002-202640 | 7/2002 | |
| JP | 2011-228512 | 11/2011 | |
| WO | 2012/112997 | 8/2012 | |

OTHER PUBLICATIONS

Austrian Patent Office Search Report (ASR) issued Oct. 22, 2013 in Austrian Patent Application A 103/2013.
English translation of Office Action issued Sep. 20, 2016 in Japanese Application No. 2015-556335.

* cited by examiner

ACTUATING DRIVE FOR MOVING A MOVEABLE FURNITURE PART

BACKGROUND OF THE INVENTION

The present invention concerns an actuating drive for moving a moveable furniture part, including: at least one moveably mounted actuating member for moving the moveable furniture part, a spring device for subjecting the actuating member to a force, and an adjusting device by which a force of the spring device acting on the actuating member is adjustable. The adjusting device has an adjusting screw having a thread, and the force of the spring device acting on the actuating member is adjustable by a screw nut mounted displaceably along the thread.

The invention further concerns an article of furniture having a furniture carcass and a flap moveable relative to the furniture carcass, wherein the flap is mounted moveably by an actuating drive of the kind to be described.

An actuating drive in the form of a so-called flap support is described, for example, in DE 100 19 337 A1. That flap support includes two hingedly interconnected arm portions, wherein an arm portion, at the flap side, is acted upon by the force of a compression spring in the opening direction. For adjustment of the force exerted on the flap, there is provided an adjusting device including a threaded bolt and a threaded nut which is in threaded engagement with the threaded bolt.

Adjusting devices with an adjusting screw and a screw nut mounted thereon frequently encounter the problem that, upon rotation of the adjusting screw, the screw nut jams upon reaching an end position against the screw head (that is to say, the annular surface formed under the screw head). Once such jamming between the screw nut and the screw head occurs, that can only be released again by the application of a high level of manual force. If the screw nut serves as a support means for the spring device, then the force of the spring device also has to be overcome in order to release the jam formed in that way. If in contrast the screw nut is moved to the free end region of the adjusting screw, it would be possible for the threaded engagement between the screw nut and the adjusting screw to be lost. The functionality of the adjusting device would therefore no longer be guaranteed.

The object of the present invention therefore is to provide an actuating drive of the general kind set forth in the opening part of this specification, while avoiding the foregoing disadvantages.

SUMMARY OF THE INVENTION

According to the invention, at least one spring element for acting upon the screw nut at an end region of the adjusting screw with a force directed away from the end region.

In other words, at least one spring element is separate from the spring device and, when an end region of the adjusting screw is reached, the spring element presses the screw nut in the direction of the opposite end region of the adjusting screw. In that way, it is possible on the one hand to effectively prevent jamming of the screw nut with the screw head. On the other hand—if required—a spring element can also be provided to prevent detachment of the screw nut from the thread, at a free end of the adjusting screw.

To provide a support means for the spring element, an abutment surface can be arranged at at least one end region of the adjusting screw, against which the abutment surface the spring element can be supported. That abutment surface can be formed by a screw head (in particular by the annular surface formed under the screw head) of the adjusting screw.

According to an embodiment, the spring element is in the form of a component separate from the screw nut. In that case, the spring element can be in the form of a coil spring or alternatively a leaf spring which is preferably pre-stressed in a bow-shaped manner. It is also possible for the spring element to be connected to the spring head or to be formed in one piece therewith (for example in the form of a plastic molding).

The spring device for acting on the actuating member can bear—preferably directly—against the screw nut, but it is also possible for the spring device to act on the screw nut indirectly (for example by way of at least one intermediate lever or the like).

In a possible embodiment, the actuating member is in the form an actuating arm mounted pivotably about an axis of rotation. It is however also possible for the actuating member to be mounted linearly displaceably, for example in the form of a piston rod, which is mounted displaceably relative to a housing accommodating the spring device.

BRIEF DESCRIPTION OF THE DRAWINGS

Further details and advantages of the present invention will be apparent from the embodiment by way of example and illustrated in the Figures, in which.

DETAILED DESCRIPTION OF THE INVENTION

Figure 1A:
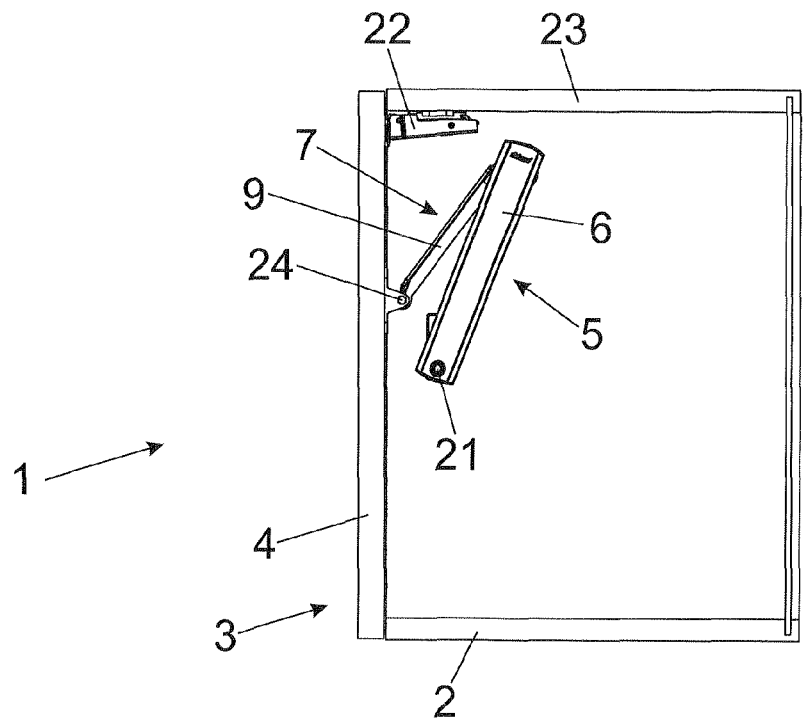
FIGS. 1a and 1b show an article of furniture with an upwardly movable flap in a closed position and in an open position.
Figure 1B:
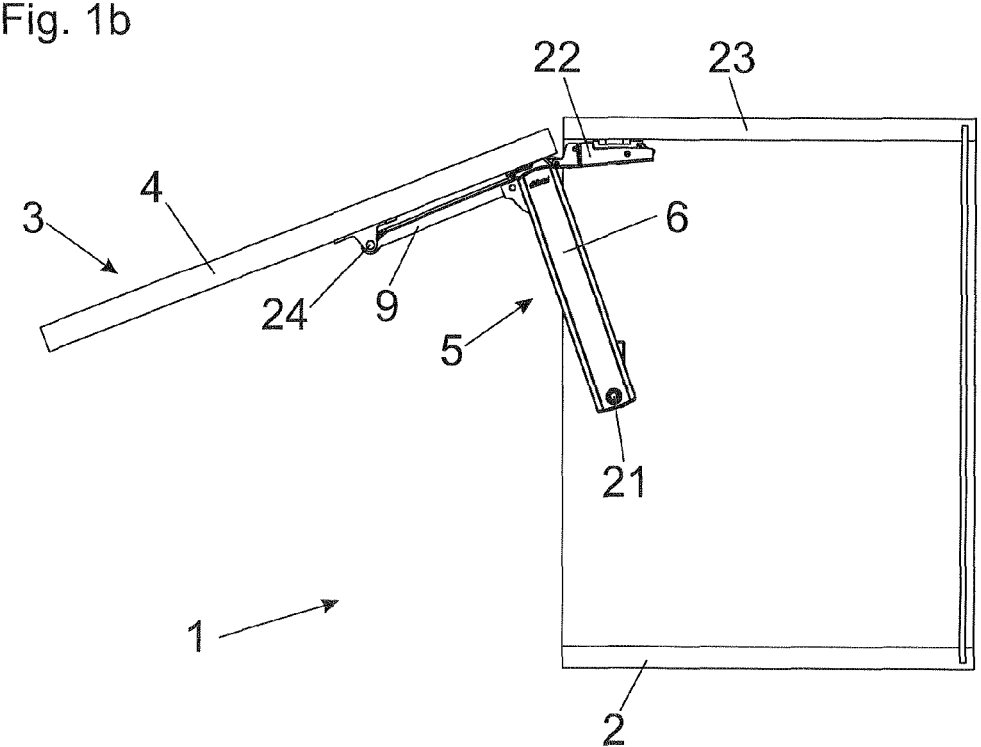

FIG. 1a shows a perspective view of an article of furniture 1 having a furniture carcass 2 and a moveable furniture part 3 in the form of a flap 4 mounted moveably upwardly relative to the furniture carcass 2. FIG. 1b shows the article of furniture 1 with the flap 4 in an open position, wherein the flap 4 is mounted pivotably by hinges 22 relative to a cabinet top 23 of the furniture carcass 2. For moving the flap 4, an actuating drive 5 having a housing 6 that is supported pivotably relative to the furniture carcass 2 at a mounting axis 21. The actuating drive 5 further includes a moveably mounted actuating member 7 which, in the illustrated embodiment, is in the form of an actuating arm 9 which, in the mounted position, is pivotally mounted about a horizontally extending axis of rotation. The flap 4 is mounted moveably by the actuating drive 5 between a vertical closed position (FIG. 1a) and an upwardly pivoted open position (FIG. 1b) which provides access to the furniture carcass 2. The pivotably mounted actuating arm 9 is connected to the flap 4 by an axis 24.

Figure 2:
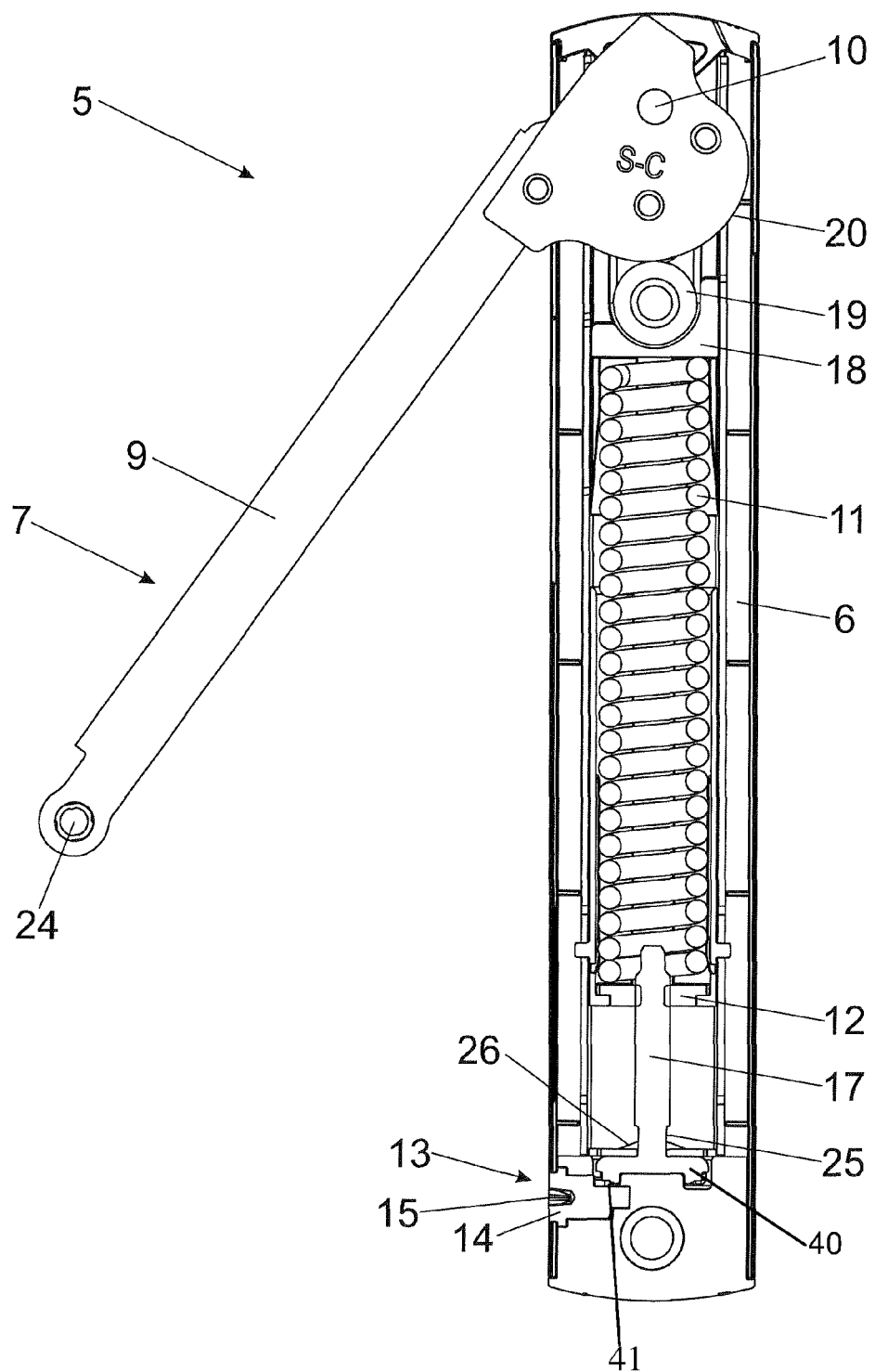
FIG. 2 shows a cross-section through an actuating drive with maximum spring prestressing.

FIG. 2 shows a cross-section of the actuating drive 5, wherein the actuating member 7 in the form of the actuating arm 9 is pivotally mounted about an axis of rotation 10 which extends horizontally in the mounted position. The free end of the actuating arm 9 is hingedly connected to the flap 4 by way of the axis 24. The actuating drive 5 includes a housing 6 which is to be fixed to the furniture carcass 2 and in which a spring device 11 is accommodated. In the illustrated embodiment, the spring device 11 includes at least one coil spring in the form of a compression spring, but it is also possible to provide two or more coil springs which are preferably arranged in parallel. The spring device 11 is supported with one end against a support means in the form of a screw nut 12, while the other end of the spring device 11 bears against a slider 18 mounted displaceably relative to the housing 6. The screw nut 12 is mounted moveably along a thread 17 of an adjusting screw 16. A pressure roller 19 is mounted rotatably on the slider 18, and the actuating arm 9 is pivotable by way of a control cam 20 along which the pressure roller 19, which is pressurized by the spring device 11, runs. In the illustrated Figure, the control cam 20 is arranged or formed on the actuating arm 9, and the control cam 20 forms a varying radial spacing relative to the axis of rotation 10 of the actuating arm 9.

The control cam 20 is designed so that the actuating arm 9 is urged into the completely closed position towards the end of the closing movement. In the opening movement of the actuating arm 9, the pressure roller 19 passes over an apex point of the control cam 20, in which case the actuating arm 9 is urged in the direction of the open position by the force of the spring device 11. A damper (not shown here), in particular a fluid damper, can also be provided for damping the closing and/or opening movement. The force of the spring device 11, acting on the actuating arm 9 can be adjusted by an adjusting device 13. The adjusting device 13 includes an adjustment wheel 14 with a receiving element 15 for a tool, and the adjustment wheel 14 cooperates with the head 40 of the adjusting screw 16 by a transmission mechanism 41, preferably a bevel gear transmission. The adjusting screw 16 is rotatable by a rotary movement of the adjustment wheel 14, implemented by a tool, whereby the screw nut 12 moves along the thread 17. Alternatively, the adjustment wheel 14 can also be designed for manual actuation. In the illustrated FIG. 2 the screw nut 12 is in a position in which the spring device 11 is pre-stressed to the maximum, that is to say the spring force acting on the actuating arm 9 is at the highest. It is possible to see a spring element 26, by way of which the screw nut 12, at at least one end region of the adjusting screw 16, can be acted upon with a force directed away from that end region. In the illustrated embodiment, the spring element 26 is in the form of a leaf spring which is pre-stressed in a bow-shaped manner and which urges the screw nut 12 away from the head 40 of the adjusting screw 16 with a force acting in the longitudinal direction of the adjusting screw 16, when the screw nut 12 is disposed adjacent to the underside (top side in FIG. 2) of the head 40 of the adjusting screw 16. The adjusting screw 16 also has a thread-less portion 25, the function of which is described with reference to the following FIG. 3.

Figure 3:
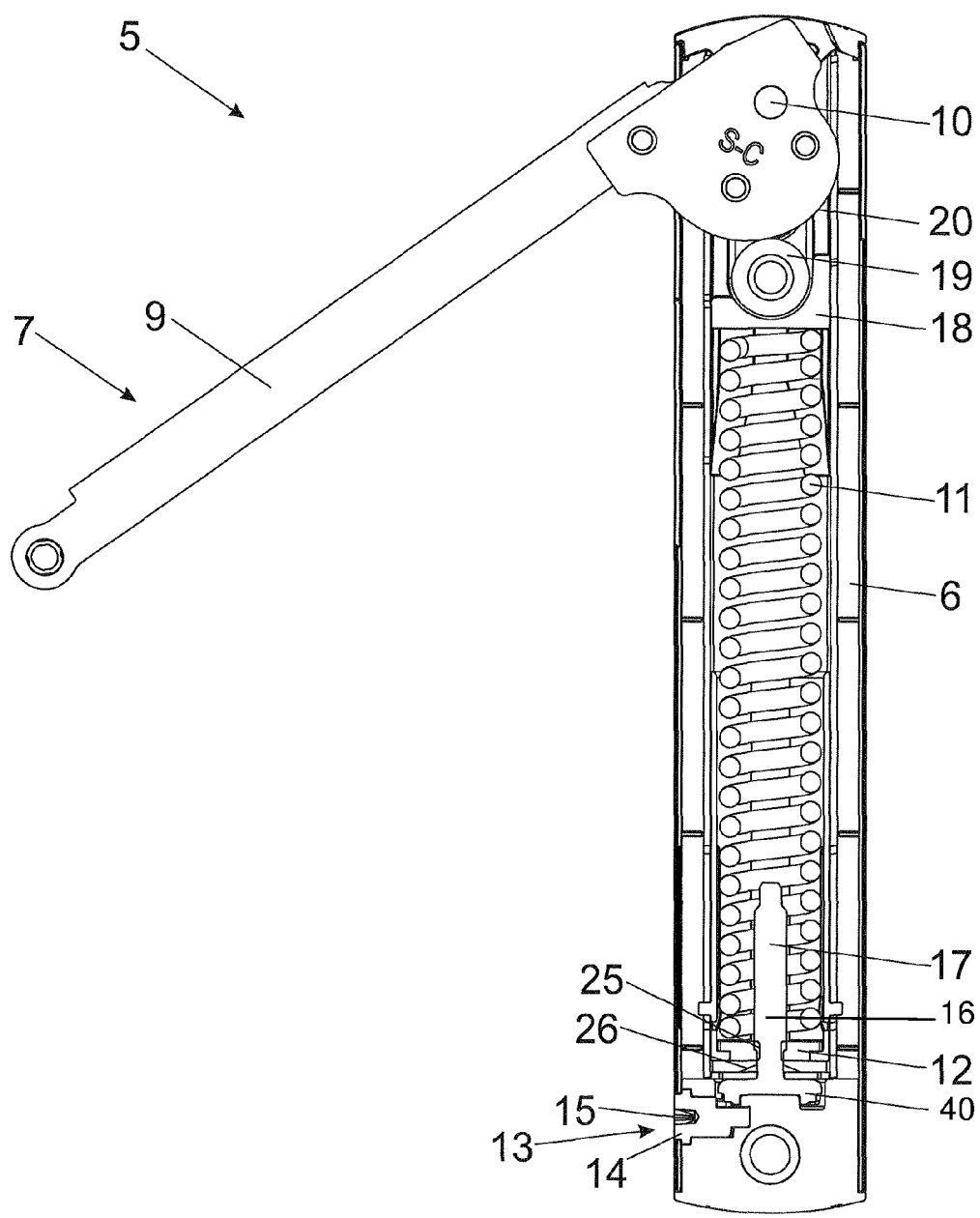
FIG. 3 shows a cross-section through an actuating drive with minimum spring prestressing.

FIG. 3 shows the actuating drive 5 as shown in FIG. 2, in which case however the screw nut 12 is in a position in which the spring device 11 is prestressed to the least, that is to say the spring force acting on the actuating arm 9 is at the lowest. In order to prevent jamming between the screw nut 12 and the head 40 of the adjusting screw 16 when adjusting the force of the spring device 11, the adjusting screw 16 has a thread-less portion 25 by way of which the screw nut 12 can be brought out of engagement with the thread 17 of the adjusting screw 16. The threaded engagement between the screw nut 12 and the thread 17 can thus be removed, and the adjusting screw 16 rotates unengaged upon a rotation of the adjustment wheel 14. That has the advantage that the screw nut 12 cannot become jammed with the head of the adjusting screw 16 in the minimum adjustment of the spring force. In addition, that end position makes itself acoustically noticeable for a user with a clicking noise. In order for the screw nut 12 to be engaged again with the thread 17 of the adjusting screw 16 upon rotation of the adjustment wheel 14 in the opposite direction, a spring element 26 is operative between the screw nut 12 and the underside of the head 40 of the adjusting screw 16, wherein the spring element 26 urges the screw nut 12 upwardly and the screw nut 12 can thus engage again in a form locking relationship with the thread 17 of the adjusting screw 16. In that case, the force of the spring element 26 is configured so as to overcome the force acting by the spring device 11 on the screw nut 12. In that way, the screw nut 12 is pressed against the thread 17 of the adjusting screw 16 by the force of the spring element 26 and against the force of the spring device 11 with a sufficiently great holding force.

Figure 4:
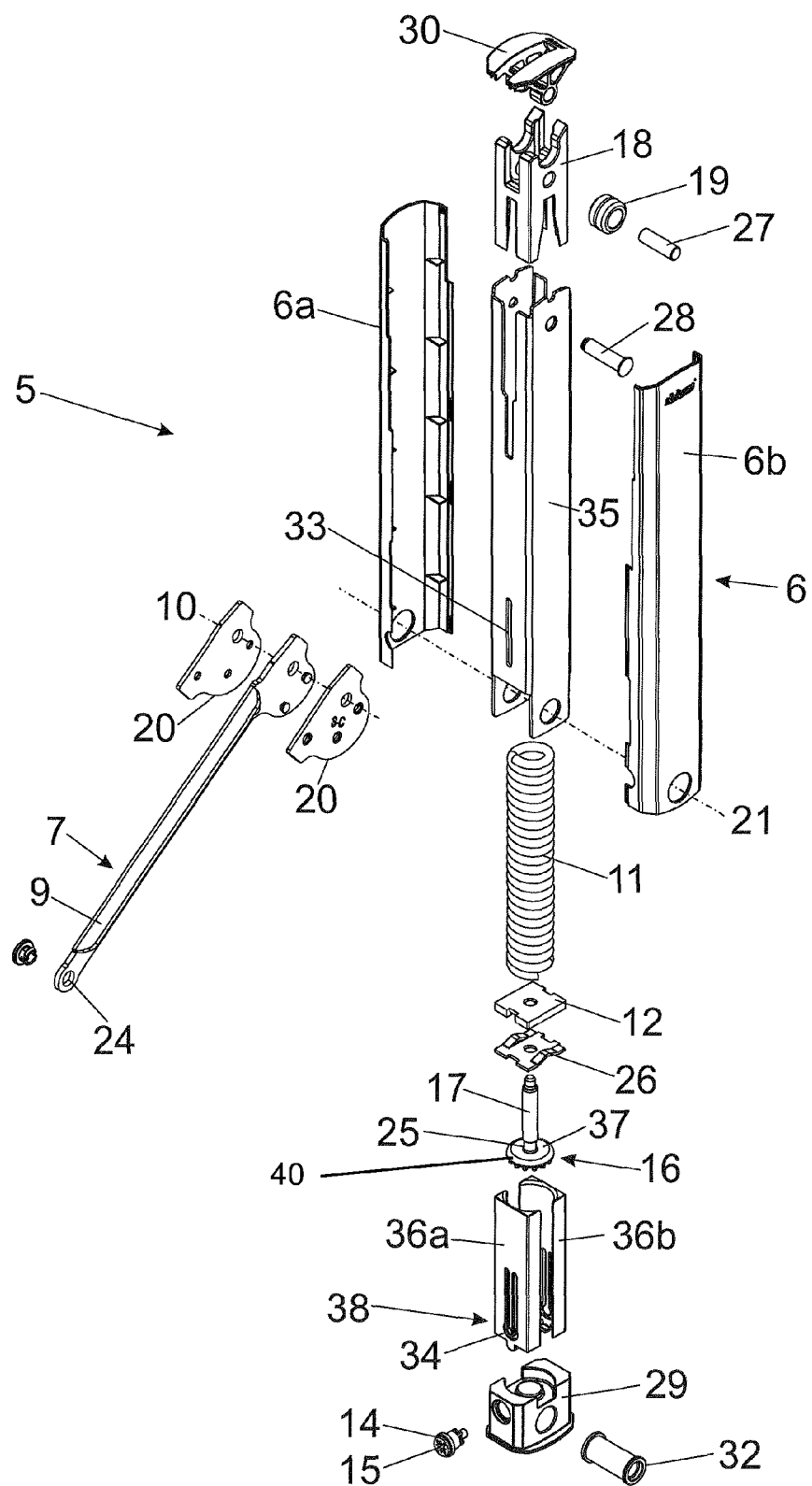
FIG. 4 shows an exploded view of the actuating drive.

FIG. 4 shows an exploded view of the actuating drive 5. The actuating member 7 in the form of the pivotable actuating arm 9 is to be connected on the one hand to the flap 4 at an axis 24, while on the other hand the actuating arm 9 is mounted at the carcass side pivotably about the axis of rotation (hinge pin 28). At both sides of the actuating arm 9, members are to be fixed which form the control cam 20. In the mounted position, the pressure roller 19 mounted rotatably on a hinge pin 27 runs along the control cam 20 of the actuating arm 9. The pressure roller 19 is arranged on the slider 18 which is pressurized by the spring device 11 and which is mounted so as to be linearly displaceable within a tubular portion 35. The spring device 11 is supported against the screw nut 12 which is mounted displaceably on the thread 17 of the adjusting screw 16. The head 40 of the adjusting screw 16 has an abutment surface 37 against which at least one spring element 26 can be supported. In the illustrated embodiment, the spring element 26 is in the form of a leaf spring which is pre-stressed in a bow-shaped manner. Provided between the thread 17 and the abutment surface 37 is a thread-less portion 25 which prevents direct contact of the screw nut 12 with the abutment surface 37 of the adjusting screw 16. The adjusting screw 16 is rotatable by placing and rotating a tool at the receiving element 15 of an adjustment wheel 14. The housing 6 includes the two housing portions 6a and 6b and is to be fixed by a mounting portion 29 and a holding bolt 32. The upper closure is formed by a cover cap 30 which can be snap-fitted onto the hinge pin 28 forming the axis of rotation 10. As a particular feature, an indicator device 38 can display the force of the spring device 11 acting on the actuating arm 9. That indicator device 38 includes guide portions 36a and 36b which are motionally coupled to the screw nut 12. Provided on at least one guide portion 36 is a projection 34 engaging into a slot 33 in the tubular portion 35. Upon displacement of the adjusting screw 16, the projection 34 of the guide portion 36 is therefore also moved therewith, in which case the position of the projection 34 changes relative to the slot 33 in the tubular portion 35. The relative position between the projection 34 and the slot 33 is a mark to be recognized by a person, in respect of the pre-set force of the spring device 11. As a supplemental feature, the tubular portion 35 can also be provided with a scale, by which a person can read off the respective value of the spring preload.

Figure 5A:
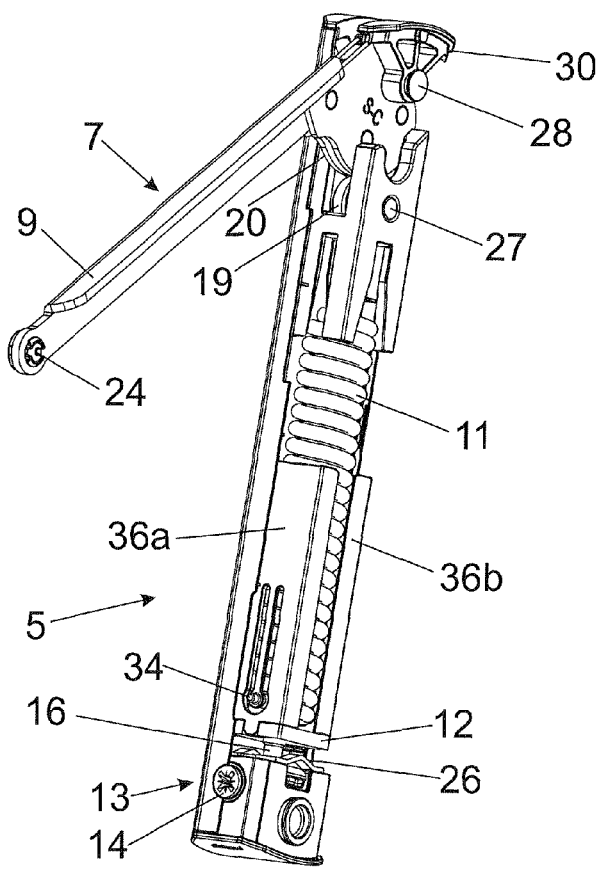
FIGS. 5a-5c show the actuating drive and two different detail illustrations as perspective views.

FIG. 5a is a perspective view of the actuating drive 5, wherein for reasons of clarity of the drawing, the tubular portion 35 shown in FIG. 4 (in which the displaceable slide 18 is accommodated) as well as the housing 6 with the two housing portions 6a and 6b are not shown. The pressure roller 19 bears against the control cam 20 of the actuating arm 9 under the force of the spring device 11, in which respect the spring force acting on the actuating arm 9 is adjustable by the adjusting device 13. The guide portions 36a and 36b with the projections 34 are connected in a form locking relationship to the screw nut 12. It is also possible to see the spring element 26 operative between the head of the adjusting screw 16 and the screw nut 12.

Figure 5B:
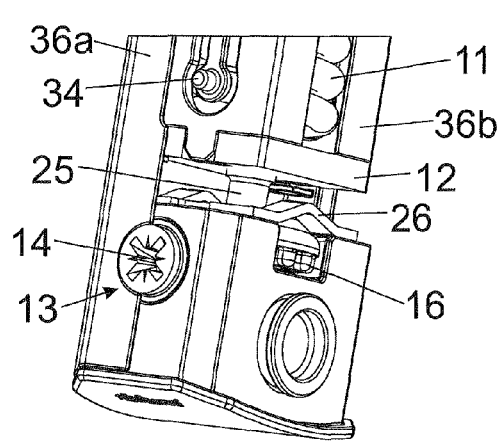

FIG. 5b shows an enlarged view of the lower region of the actuating drive 5. The adjusting screw 16 and therewith the position of the screw nut 12 can be adjusted by rotation of the adjustment wheel 14.

Figure 5C:
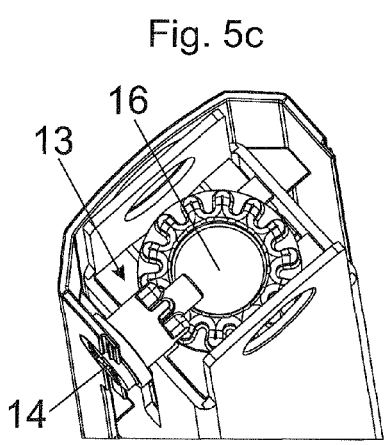

FIG. 5c shows a view from below of the actuating drive 5, wherein the adjustment wheel 14 is connected to the adjusting screw 16 by cooperating toothings. The adjustment wheel 14 is mounted rotatably about an axis of rotation, the direction of the axis of rotation of the adjustment wheel 14 extending transversely, preferably approximately at a right angle, relative to a longitudinal axis of the adjusting screw 16. That deflection of force has the advantage that a screwdriver for adjustment of the adjustment wheel 14 can be fitted and rotated laterally, that is to say in the mounted position approximately perpendicularly to a side wall of the furniture carcass 2, thereby permitting particularly convenient, easily accessible and smooth adjustment of the prestressing force of the spring device 11.

The invention claimed is:

1. An actuating drive for moving a moveable furniture part, comprising:
   a moveably mounted actuating member for moving the moveable furniture part;
   a spring device for applying a force to said actuating member;
   an adjusting device for adjusting the force of said spring device acting on said actuating member, said adjusting device including:
      an adjusting screw having a thread portion, a head, and a threadless portion between said thread portion and said head; and
      a screw nut mounted displaceably along said adjusting screw, said threadless portion being configured to allow said screw nut to disengage from said thread portion;
      wherein said adjusting device is configured to adjust the force of said spring device acting on said actuating member via movement of said screw nut along said thread portion of said adjusting screw; and
   a spring element separate from said spring device, and located adjacent to said head of said adjusting screw and operative between said screw nut and said head, said spring element being configured to bear against said screw nut and apply a force of said spring element against said screw nut in a direction away from said head of said adjusting screw.

2. The actuating drive according to claim 1, wherein said actuating member is an actuating arm mounted pivotably about an axis of rotation.

3. The actuating drive according to claim 2, further comprising a control cam and a pressure roller running along said control cam and pressurized by said spring device, said control cam being interconnected to said actuating arm so as to pivot said actuating arm via the force from said spring device.

4. The actuating drive according to claim 3, wherein said control cam is on said actuating arm, said control cam being configured to provide a varying radial spacing between said spring device and said axis of rotation of said actuating arm.

5. The actuating drive according to claim 1, wherein said adjusting device further includes:
   an adjustment wheel having a receiving element for receiving a tool; and
   a transmission mechanism for allowing said adjustment wheel to cooperate with said adjusting screw such that said adjusting screw is rotatable by a rotary movement of said adjustment wheel implemented by the tool.

6. The actuating drive according to claim 5, wherein said adjustment wheel is mounted rotatably about an axis of rotation, the axis of rotation of said adjustment wheel extending transversely relative to a longitudinal axis of said adjusting screw.

7. The actuating drive according to claim 6, wherein the axis of rotation of said adjustment wheel extends at a right angle relative to the longitudinal axis of said adjusting screw.

8. The actuating drive according to claim 1, wherein said spring element is a leaf spring.

9. The actuating drive according to claim 8, wherein said leaf spring is pre-stressed in a bow-shaped manner.

10. The actuating drive according to claim 1, wherein said spring element is configured to apply the force of said spring element against said screw nut in a direction to engage said screw nut with said thread portion.

11. The actuating drive according to claim 1, wherein said head has an abutment surface against which said spring element is supported.

12. The actuating drive according to claim 1, wherein said spring element is formed as a component separate from said screw nut.

13. The actuating drive according to claim 1, wherein said spring device comprises at least one coil spring.

14. The actuating drive according to claim 1, further comprising a housing to be fixed to a furniture carcass, said actuating member being pivotably connected to the furniture carcass and to the moveable furniture part.

15. An article of furniture comprising:
   a furniture carcass;
   a flap moveable relative to said furniture carcass; and
   an actuating drive according claim 1 for moveably mounting said flap to said furniture carcass.

* * * * *